March 15, 1960 E. LECLUYSE ET AL 2,928,218
MACHINE FOR CLOSING TUBES OF PLASTIC MATERIAL THROUGH FUSION
Filed Nov. 19, 1954 3 Sheets-Sheet 1

INVENTORS
ALBERT QUINCHE
EDOUARD LECLUYSE
BY *Cushman, Darby & Cushman*
ATTORNEYS

INVENTORS
ALBERT QUINCHE
EDOUARD LECLUYSE
ATTORNEYS

March 15, 1960   E. LECLUYSE ET AL   2,928,218
MACHINE FOR CLOSING TUBES OF PLASTIC MATERIAL THROUGH FUSION
Filed Nov. 19, 1954   3 Sheets-Sheet 3
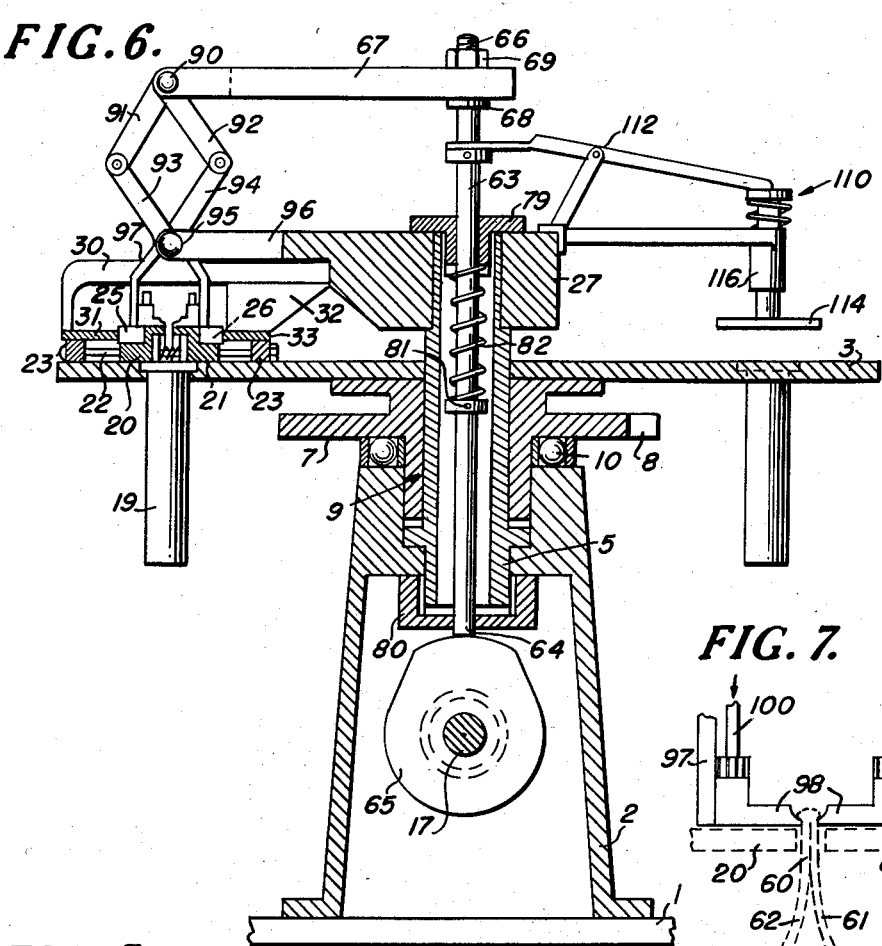
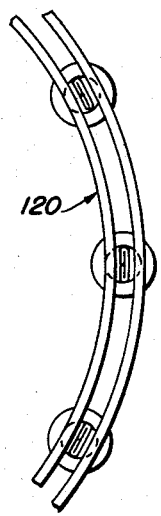
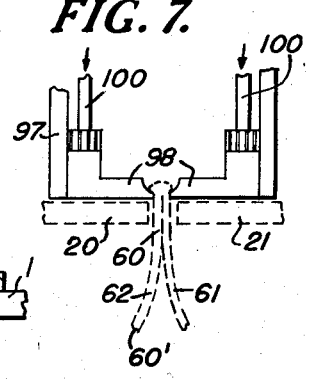
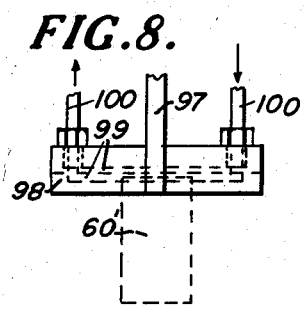
INVENTORS
ALBERT QUINCHE
EDOUARD LECLUYCE
BY
ATTORNEYS United States Patent Office 2,928,218
Patented Mar. 15, 1960

2,928,218

MACHINE FOR CLOSING TUBES OF PLASTIC MATERIAL THROUGH FUSION

Edouard Lecluyse, Vevey, and Albert Quinche, Saint-Sulpice, Switzerland, assignors, by mesne assignments, to American Can Company, New York, N.Y., a corporation of New Jersey Application November 19, 1954, Serial No. 470,076

13 Claims. (Cl. 53—141)

This invention relates to plastic sealing machines and more particularly to an improved machine for closing tubes of plastic material through fusion.

The present invention has for its principal object a machine for closing through fusion an open end of tubes of plastic material comprising a frame, means rotatably mounted on said frame for receiving said tubes at annularly spaced positions thereon, means for clamping together the edges of the open end of each tube, means for heating said edges to thereby fuse them together, means for applying a cold pressure to said fused edges and means for cooling the compressed fused edges.

An additional object of this invention is to provide a machine for closing through fusion an open end of tubes of plastic material comprising a frame, a turret member rotatably mounted on said frame, a plurality of annularly spaced pairs of relatively movable jaws carried by said turret member for receiving tubes therebetween, means carried by said frame for relatively moving said jaws so as to clamp together the edges of the open end of the tube disposed therebetween, means for heating said edges to thereby fuse them together, means for applying a cold pressure to said fused edges and means for cooling the compressed fused edges.

Another and more specific object of this invention is to provide a machine for closing through fusion an open end of a tube of plastic material comprising a frame, a turret rotatably carried by said frame, means for intermittently rotating said turret, said turret having a plurality of annularly spaced depending sleeves or housings for receiving said tubes, means for positioning successive tubes in said sleeves, a pair of jaws mounted on said turret adjacent each sleeve, fixed cam means for effecting a relative movement between said jaws to clamp together the edges of the open end of each tube, means for applying heat to the clamped edges of each successive tube to thereby fuse them together, means for applying cold pressure to the fused edges of each successive tube, means for cooling the compressed fused edges of each successive tube and means for ejecting the closed tubes from successive sleeves.

Accompanying drawings show by way of example a preferred embodiment of the machine forming the object of the invention. In said drawings:

Figure 1 is a side elevational view of the machine;

Figure 4 is a side elevational view of a structural detail;

Figure 5 is a fragmentary view showing radiant heating coils which can be utilized in a modified form of the apparatus;

Figure 6 is a vertical sectional view illustrating the structural details of the cold pressure applying means and of the positioning element;

Figure 7 is a side view of the cold pressure applying means on an enlarged scale; and Figure 8 is a side view of additional features of the cold pressure applying means.

Figure 3:
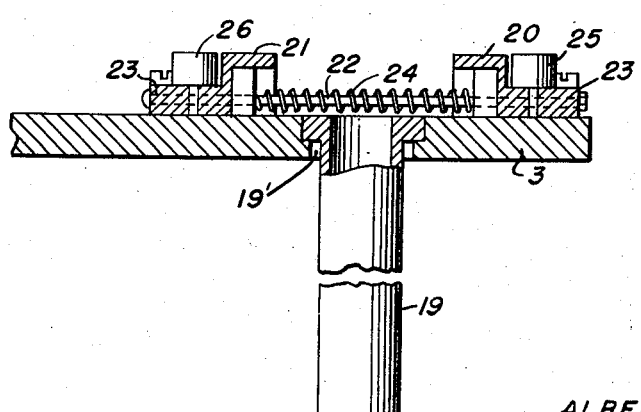
Figure 3 is an enlarged sectional view through line 3—3 of Figure 2.

The machine illustrated includes a bed 1 to which is secured a frame 2 carrying a spindle 4, a sleeve 5 and a turret 3 rotatably mounted in the frame. To the turret 3 is secured by means of screws 6 a disc 7 provided with eleven notches 8 along its periphery. Said disc is rigid or integral with a sleeve 9 and is borne by the frame 2 through the agency of ball bearings 10. The disc 7 is rotated intermittently by means of a projection 11 secured to a plate 12 adapted to assume a continuous rotary movement with reference to a support 13. For this purpose, the plate 12 is rigid with a spindle 14 carrying a bevel pinion 15 meshing with a corresponding bevel pinion 16 fitted on a shaft 17, rotated by means of an electric motor that is not illustrated, and held in a bearing support member 18. The projection 11 sequentially engages at each revolution of the plate 12 an advancing notch 8 in the disc 7 and causes the latter to rotate by $\frac{1}{11}$ of a revolution, together with the turret member 3. The turret 3 may be provided with circumferentially spaced shouldered recesses or openings 19' (Fig. 3) corresponding in number to the notches 8. Fixed in the recesses 19' are the upper ends of correspondingly shouldered depending sleeves or tubular housings 19 for receiving and holding the plastic tubes 60' of polyethylene or light plastic material, as the tubes are carried by the turret sequentially past spaced treating stations. The open ends 60 (Fig. 7) of the tube 60' are fused after the tubes have been filled and in a manner subsequently to be described. It should be emphasized that, although the machine illustrated contemplates eleven stations, the invention is in no way limited in this respect. As can be appreciated, a larger machine having, for example, twenty-two corresponding stations, can be constructed in the same manner.

Positioning means are also included in this machine and comprise patter element 110 which is pivotally carried by the frame 2 at 112 and has an outer portion 114 movable through bushing 116 into engagement with the open end of the tube in a depending sleeve 19 to position the exposed edges thereof a predetermined distance above the said sleeves 19 so as to be engaged by the clamping jaws 20 and 21 (Fig. 7). The patter element is actuated by upward movement of rod 63 slidingly mounted in sleeve 5. One of the ends 64 of rod 63 is held in contacting relationship with a cam 65 carried by the drive shaft 17. Abutment 81 is carried on rod 63 and is subject to pressure of return spring 82.

Above each of the tube holding sleeves 19 and on opposite sides thereof the turret 3 carries two confronting jaws 20 and 21 slidingly mounted on two rods 22 secured between two bars 23 rigid with the turret 3. The jaws 20 and 21 are spaced apart by means of two coil springs 24 wound over the rods 22 and said jaws carry corresponding ball bearings 25 and 26.

The sleeve 5 on the spindle 4 carries a support 27 secured thereto through the agency of a retaining ring 79. Said support 27 is provided with elongated radial arms 30 carrying an annular outer cam surface guiding member 31 along which the roller bearings 25 on the outer jaws 20 are adapted to run, so as to provide for the shifting of the corresponding jaws 20 with a view to insuring the clamping of the edges 61 and 62 of the opening 60 in the tube 60' to be fused. The same support 27 is also provided with shorter arms 32 carrying a corresponding annular inner cam surface guiding member 33 along which the ball bearings 26 run, during the movement of the corresponding jaws 21 so that the edges of the openings in the tubes to be fused are held fast against each other.

To the same support 27 are also secured three forks 122, 34 and 35 carrying three stationary burners 124, 36 and 37 fed with combustible gases through the pipes 126, 38 and 39, said burners 124, 36 and 37 being used for heating the edges of the openings in the different tubes. The support 27 also carries two forks 40 and 41 on which is mounted a cooling distributing pipe 42 fed with cold compressed air by a pipe 43, the distributors 124, 36, 37 and 42 being provided, in register with the turret member 3, with small openings, that are not illustrated, for the output of gas and air respectively. Said distributors are located above five positions occupied by the sleeves 19 while the turret member 3 revolves.

As can be appreciated, other heating means than the gas burners 124, 36 and 37 can be utilized. Illustrated in Figure 5 is a preferred method of heating including the radiant heating elements 120 which are positioned on either side of the clamped edges of the tube in close proximity thereto as the latter passes through the fusion stage.

After the edges of the tube 601 are heated, but prior to the cooling thereof, they are subjected to cold pressure means illustrated in Figures 6 through 8. These cold pressure means operate through utilization of the actuating means previously noted for the patter element. This includes rod 63 slidingly mounted inside sleeve 5. As noted heretofore, one of the ends 64 of rod 63 is held in contacting relationship with a cam 65 carried by the drive shaft 17. The other end 66 of the rod 63 is provided with an arm 67 held fast between a shoulder 68 and a nut 69 carried by said rod. Said arm 67 is parallel with the turret 3 and is provided at its end with a pivot 90 on which are rotatably mounted two levers 91 and 92. The latter are pivotally secured to the corresponding arms 93 and 94, thus forming a toggle linkage 95 carried by a support 96 secured to member 27. The ends 97 of the toggle linkage are provided each with a lateral jaw 98 in which is formed a channel 99 connected with feed pipe 100 which provides for the cooling of the jaws with water, air, or the like.

As previously noted with respect to the patter element, the rod 63 passes through a guiding bore extending through the retaining rings 79 and 80 screwed over the ends of the sleeve 5. It carries an abutment 81 which is subjected to the pressure of one end of a return spring 82, the other end of which bears against said retaining ring 79.

The shaft 17 carries a cam 44 provided with a projection 45 adapted to actuate a lever 46 shifting longitudinally a rod 47 adapted to extend into each recess 19 of the turret member 3, for the extraction of the corresponding tube therein after closing. The lever 46 is pivotally secured to a carrier 48 rigid with the bed 1. The latter also carries a stand 49 providing for the guiding of the vertically moving rod 47.

The projection 45 of the cam 44 controls through the agency of the lever 51 a rod 52 operating a valve 53 controlling the opening of a pipe feeding compressed air 54 and provided with a shut off valve 55. The pipe 54 is secured to a carrier 56 rigid with the bed 1 and it carries in its turn a small bar 57 to which is revolubly secured the lever 51. The pipe 54 is provided with an exhaust duct 58, the end 59 of which engages in succession the lower end of each of the tube holding sleeves 19 while a return spring that is not illustrated is housed inside the valve 53 so as to urge permanently the rod 52 against the lever 51.

Of course, it can be appreciated that an ejecting means comprising an air blast alone without the inclusion of rod 47 can also be utilized in this machine. Such air blast would be applied directly to the bottom end of the sleeve 19 in sufficient force to eject the finished tube.

Conversely, the ejecting means can comprise solely the rod 47 to push the completed tube out of sleeve 19. Air might then be applied to the ejected tube in order to facilitate removal of the same from the mouth of the sleeve 19.

Figure 2:
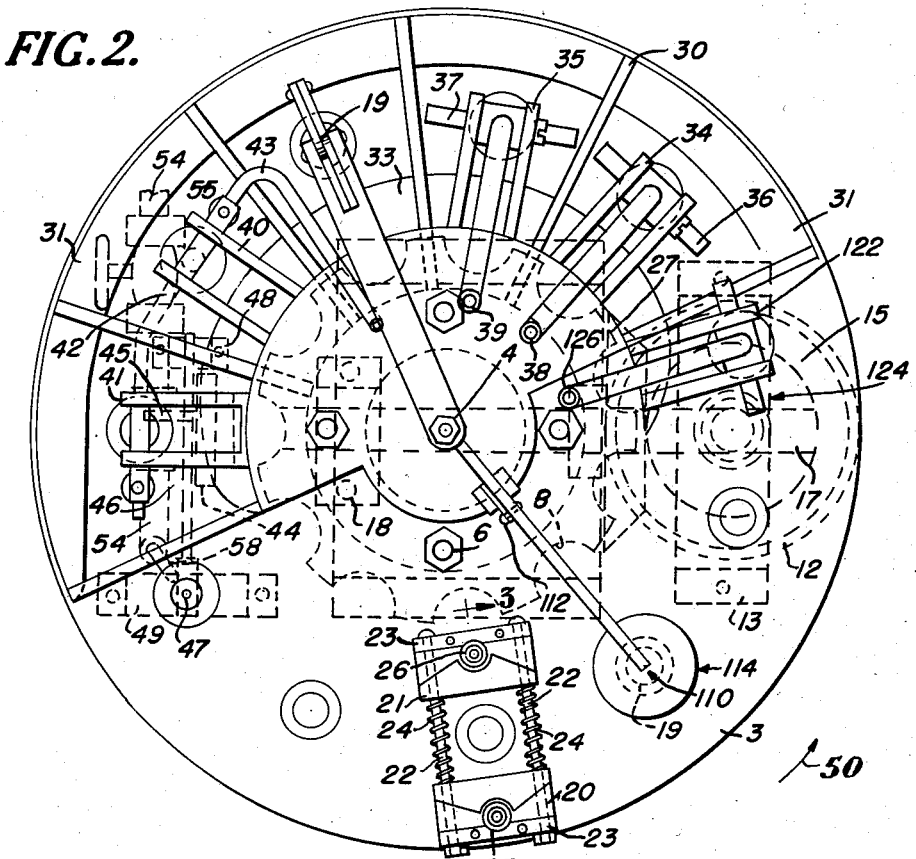
Figure 2 is a plan view thereof with several of the clamping jaw assemblies associated with the tube holding sleeves omitted for purpose of illustration.

The machine illustrated operates as follows:

The revolving turret member 3 is actuated intermittently so as to revolve in the direction of the arrow 50 through the agency of the disc 7, of the plate 12, of the bevel wheels 15 and 16 and of the driving shaft 17. Tubes of plastic material are introduced in succession into the different sleeves 19 in advance of the positioning means 114 (Fig. 2) and are positioned by platter element 110. These tubes are then filled by an arrangement provided for this purpose. Both the introduction of the tubes into the sleeve, and the filling of said tubes can be done either manually or automatically. This invention contemplates the use of an automatic feeding mechanism to feed open ended tubes into successive sleeves of the turret member 3. In addition, an automatic filling machine can be utilized to fill the tube prior to the fusion of its open end.

Lastly, each tube to be filled and the corresponding sleeve 19 move between the annular guiding members 31 and 33 which control the jaws 20 and 21 with a view to urging towards each other and clamping together the edges of the openings of the tube. When a sleeve 19 arrives in vertical register with the gas burner 124, the open end portion of the tube is flattened and remains underneath said burners 124, 36 and 37 during about $3/11$ of the time required for the turret member 3 to execute one revolution. During this time, said edges are heated and fused.

After the edges are heated and fused, they are immediately subjected to cold pressure by means of cooled clamping jaws 98. Thereafter, each sleeve 19 passes underneath additional cooling means 42 and is held thereunder approximately $2/11$ of the time required for one revolution of the turret member 3.

Lastly, each sleeve 19 enters a position in register with the extraction rod 47 and with the end 59 of the exhaust duct 58 and it remains stationary during $1/11$ of the duration of rotation of the turret member 3. During this time, the rod 47 enters the corresponding sleeve 19 and passes out of the same after ejection of the fused tube on the one hand and, on the other hand, the valve 53 opens under the action of the rod 52 controlled by the lever 51, which latter is in its turn shifted by the projection 45 on the cam 44 revolving in unison with the shaft 17. Because of the opening of said valve 53, the compressed air from the pipe 58 enters the lower end of the sleeve 19 and cooperates in the extraction of the completed tube which is projected at a certain distance out of and beyond its sleeve.

As a substitute for the patter member previously described as the positioning means, it is possible to secure to the bed 1 and arrangement including a vertical tube connected through a pipe with a container subjected to the action of a vacuum pump. The upper end of said tube is provided with a rubber ring in fluid-tight engagement with the lower end of each sleeve 19 at the time the open ended tube is inserted therein. In said position, which is occupied for approximately $1/11$ of the duration of revolution of turret member 3, the vertical tube is subjected to the action of the said vacuum pump which produces a suction inside sleeve 19 and consequently shifts towards the lower end of the latter, and positions, the tube which is to be fused.

It should be appreciated that the machine described heretofore is utilized for closing the open ends of tubes of plastic material. This plastic material is, in most instances, polyethylene or polyvinyl chloride. However, all fusible plastic materials are contemplated.

By utilizing our novel machine, it is possible to facilitate the sealing of the bottoms of plastic tubes and to secure a seal of a strength greater than that contemplated heretofore. The novel characteristics possessed by the product attained can be attributed to the machine in its entirety and particularly to the cold pressure applying means utilized subsequent to the formation of the fused joint between the edges of the open end of the tube.

The novel principles of this invention are broader than the specific embodiments recited above and rather than unduly extend this disclosure by attempting to list all the numerous modifications which have been conceived and reduced to practice during the course of this development, these novel features are defined in the following claims.

We claim:

1. A machine for closing through fusion the open ends of plastic tubes including in combination, a frame, a turret rotatably mounted on said frame, means for intermittently rotating said turret, said turret having circumferentially spaced sleeves for receiving the plastic open ended tubes, said machine having circumferentially spaced treating stations which the turret sleeves pass when said turret makes a complete revolution, one of said stations having means for positioning the upper portion of the tube in said sleeve a predetermined distance above the sleeve, clamping jaws carried on said turret, said jaws arranged in pairs positioned on opposite sides of each of said sleeves for engaging the exposed end portion of a tube, spaced fixed cam means positioned to be encountered by each pair of jaws in turn for moving the jaws of the pair towards each other to clamp the opposed upper edges of the tube after each tube passes the tube positioning means and heating means at the next advancing station and disposed out of contact with the tubes for fusing the clamped edges of the tube together, means at the next station for applying cold clamping pressure to said fused edges, and means at a subsequent station for further cooling the compressed fused edges of the tubes after the cold pressure applying means have been withdrawn therefrom.

2. A machine for closing through fusion the open ends of plastic tubes including in combination, a frame, a turret rotatably mounted on said frame, means for intermittently rotating said turret, said turret having circumferentially spaced sleeves for receiving the plastic open ended tubes, means for positioning successive tubes in said sleeves, a pair of jaws mounted on said turret adjacent each sleeve, spaced fixed cam means on said frame and positioned to be encountered by each pair of jaws in turn in predetermined positions thereof for effecting relative movement between the jaws of the pair to clamp together the edges of the opened end of each tube, means disposed out of contact with the tubes and effective as the turret is rotated for applying heat to the clamped edges of each successive tube to fuse the edges together, means for applying cold clamping pressure to the fused edges of each successive tube while the turret is at rest, means for cooling the compressed fused edges of each successive tube after the cold pressure applying means is withdrawn, and means for ejecting the fused tubes from said sleeves when the latter reach a predetermined discharge point.

3. A machine as defined in claim 2 wherein each pair of jaws is spring urged apart and the jaws of each pair are provided with rollers for engaging said cam means.

4. A machine as defined in claim 2 wherein said cam means comprises a pair of spaced arcuate sectors rigidly supported by said frame.

5. A machine as defined in claim 2 wherein said ejecting means includes a rod movable into engagement with successive tubes to eject the same.

6. A machine as defined in claim 2 wherein said pressure applying means includes a pair of levers pivotally mounted on said frame, jaws carried by the free ends of said levers for engaging the fused edges of each successive tube.

7. A machine as defined in claim 6 wherein said pressure applying means further includes a toggle linkage connected between the opposite ends of said levers and cam actuated means for moving said toggle linkage.

8. A machine for closing through fusion the opened end of plastic tubes including in combination, a frame, a turret rotatably mounted on said frame, means for intermittently rotating said turret, said turret having circumferentially spaced sleeves for receiving and holding the plastic tubes in vertical position, a longitudinally disposed drive shaft mounted on the frame, spaced cams fixed to said drive shaft, a vertically disposed tubular member extending upwardly from the frame, an axially displaceable rod extending through said tubular member and engaging at its lower end one of said cams, a support fixed to said tubular member above said turret, said support having radial long arms and circumferentially spaced radial short arms extending outwardly therefrom, an outer cam member on said frame and connected to said longer arms, an inner cam member on said frame and spaced from said outer cam member and connected to said shorter arms, vertically displaceable positioning means positioned above said turret and arranged to register in turn with each of the sleeves during the rests between intermittent turret rotations, said positioning means being spaced a predetermined distance above the turret so as to engage the exposed portion of a tube within the sleeve when the latter is moved into registration therewith, means operatively connecting said positioning means to said displaceable rod, a pair of jaws movably mounted on said turret adjacent each of said sleeves, each of said pair of jaws being provided with spaced rollers one of which engages the outer cam and the other the inner cam so as to control the movement of the jaws towards and away from each other to close and clamp the open end of the tube in the corresponding sleeve at a location below the upper edge thereof, means for heating the exposed edges of the clamped tube to soften the same as the turret indexes, movable cooling means positioned above the jaws and arranged to engage and clamp the edges of the tube so as to apply a cooling pressure thereto after the tube has been clamped by said jaws and heated, and means operatively connected to said driving shaft and said displaceable rod for controlling the operation of the movable cooling means.

9. A machine for closing through fusion the open ends of plastic tubes including in combination, a frame, a turret rotatably mounted on said frame, means for intermittently rotating said turret, said turret having circumferentially spaced fixed depending sleeves for receiving the plastic open ended tubes, tube positioning means including a patter member pivotally connected to said frame and having an outer flat end sequentially movable into engagement with the open upper ends of the tubes so as to position the exposed ends of the tubes a predetermined distance above the sleeves, a pair of jaws mounted on said turret adjacent each sleeve, spaced cam means on said frame engageable with said jaws for effecting relative movement between the jaws to clamp together the edges of the opened end of each tube, means as the turret is rotated for applying heat to the clamped edges of each successive tube to fuse the edges together, means for applying cold pressure to the fused edges of each successive tube, means for cooling the compressed fused edges of each successive tube, and means for ejecting the fused tubes from said sleeves when the latter reach a predetermined discharge point.

10. A machine for closing through fusion the open ends of tubes of plastic having substantially the heated surface sticking properties of polyethylene, including in combination a frame, conveyor means supported on the frame and carrying a plurality of sleeves for receiving the open-ended tubes, means to progress said conveyor intermittently to present each of said sleeves in turn to a series of work performing stations, means operable as the conveyor progresses for urging together to juxtaposed position and so holding opposed portions of the exposed edges of the open upper end of each tube throughout its passage through the work performing stations, means at one of said stations disposed out of contact with the tubes for heating said juxtaposed edges to fuse them, cooled jaws at another of said stations for applying cold clamping pressure to said fused edges while the conveyor is at rest, and means arranged along the subsequent path of travel of the tube for affirmatively cooling the compressed fused edges after the cold pressure applying jaws are withdrawn therefrom and prior to release of said urging and holding means, whereby the operating cycle of said conveyor may be set at a speed determined solely by the time necessary to hold said cold pressure applying jaws closed for securing a firm seal between the fused plastic portions, and without regard for obtaining a completely set condition of the joint.

11. A machine as called for in claim 10 in which means are provided for ejecting the fused and cooled tube from the sleeve.

12. A machine as called for in claim 10 in which the cold pressure applying means includes a pair of jaws having channels within which the coolant circulates.

13. A machine as called for in claim 10 in which the cooling means includes spaced pipes for feeding compressed air to the fused edges of the tube.

References Cited in the file of this patent

UNITED STATES PATENTS

| | | |
|---|---|---|
| 718,308 | Braun et al. | Jan. 13, 1903 |
| 1,653,908 | Hunt | Dec. 27, 1927 |
| 1,911,805 | Cleaves | May 30, 1933 |
| 1,961,126 | Becker | June 5, 1934 |
| 1,964,411 | Beutel | June 26, 1934 |
| 1,976,259 | Jahne | Oct. 9, 1934 |
| 2,218,585 | Merkle | Oct. 22, 1940 |
| 2,227,757 | Loepsinger | Jan. 7, 1941 |
| 2,265,381 | Malloy | Dec. 9, 1941 |
| 2,321,729 | Beasley | June 15, 1943 |
| 2,419,982 | Zwoyer | May 6, 1947 |
| 2,449,478 | Herzog | Sept. 14, 1948 |
| 2,568,794 | Dieter | Sept. 25, 1951 |
| 2,606,850 | Piazze | Aug. 12, 1952 |
| 2,676,443 | Piazze | Apr. 27, 1954 |
| 2,679,469 | Bedford | May 25, 1954 |
| 2,691,474 | Olson | Oct. 12, 1954 |
| 2,696,245 | Fisher | Dec. 7, 1954 |
| 2,744,669 | Ashe et al. | May 8, 1956 |
| 2,766,571 | Bryce | Oct. 16, 1956 |